United States Patent [19]

Murphy

[11] 3,989,887

[45] Nov. 2, 1976

[54] SWEPT FREQUENCY TRAP JAMMER FOR SECURE TELEVISION SYSTEM

[75] Inventor: William D. Murphy, Burlington, Mass.

[73] Assignee: GTE Laboratories Incorporated, Waltham, Mass.

[22] Filed: Aug. 28, 1975

[21] Appl. No.: 608,429

[52] U.S. Cl. ................................. 178/5.1; 325/132; 325/477
[51] Int. Cl.² ........................................... H04N 1/44
[58] Field of Search ..................... 178/5.1, DIG. 13; 325/132, 167, 477, 308

[56] References Cited
UNITED STATES PATENTS
3,859,457 1/1975 Kirk, Jr. ............................... 178/5.1
3,898,375 8/1975 Hannan et al. ....................... 178/5.1

Primary Examiner—Maynard R. Wilbur
Assistant Examiner—S. C. Buczinski
Attorney, Agent, or Firm—Irving M. Kriegsman; Leslie J. Hart

[57] ABSTRACT

A jamming circuit for making unusable the television signal of a preselected channel includes a bridged T-trap filter having a pair of high Q circuits adapted to be tuned to the carrier frequency of the preselected channel, and a device for cyclically sweeping each tunable circuit through the video carrier frequency for the preselected channel. Each circuit is varied approximately ± 500 KHz from the carrier frequency, the cyclic sweeping rate being 14 KHz for one tunable circuit and 16 KHz for the other. Cyclic tuning is achieved by using varactors as part of the tuning capacity for each circuit, the varactors receiving a sawtooth waveform produced by two free-running oscillators. As a result of the jamming circuit, the television signal is modulated at a 14 KHz, 16 KHz and 2 KHz rate, thereby producing severe amplitude and phase distortion.

21 Claims, 2 Drawing Figures

SWEPT FREQUENCY TRAP JAMMER FOR SECURE TELEVISION SYSTEM

BACKGROUND OF THE INVENTION

The present invention relates to a secure television system for a CATV system having "pay TV" service in which two-way communication capability between the customer and a pole mounted customer service unit is present. More specifically, the invention relates to jamming the secure channel at a customer service unit and providing a bypass system around the jammer at the customer's request.

One concept of providing "pay TV" service on a CATV system involves jamming a selected channel, thereby making the picture unusable. Access to the "pay" channel does not involve decoding at the customer's receiver, but rather bypassing the jammer circuits. Jamming is done on the cable system just prior to the customer cable "drop". One jammer unit serves several customers, with each customer controlling his individual bypass switch. The jammer unit, or customer service unit (SCU), is pole mounted and contains the jammer, bypass switch for several customers, and billing information circuits for each customer. There are several conventional techniques for achieving jamming. The pay TV channel can be filtered out with band-stop filters, or more easily, the non-pay channels only are passed through a band-pass filter, thereby rejecting the pay channel. Secondly, a phase locked oscillator signal can be added to the pay channel video carrier, causing sync and video inversion, which in turn produces a distorted picture on the customer's receiver. Also, a highly selective trap can be tuned to the pay TV video carrier frequency, producing severe amplitude and phase distortion of the pay TV signal.

However, these techniques have disadvantages which make their widespread use less than desirable. Shortcomings of the filter system are the complexity of design and alignment of an adequate filter, plus the loss of one or more channels in the cross-over region of the filter. The phase lock oscillator also requires a filter to insure that the loop is locked to the desired picture carrier and not to an adjacent channel signal. A practical system would require conversion to a low frequency IF, phase locking, and "up converting" to the carrier frequency. Additional filters would be needed to remove spurious signals falling within any other channel. The bridged T trap appears to have advantages over the other systems. It is capable of up to 60 db rejection of a single frequency, and has only about 1 db attenuation of adjacent channel signals when tuned to the desired picture carrier frequency. It is also a passive device and relatively easy to design and construct. However, the trap is temperature sensitive and requires extremely critical adjustments for alignment. For example, two high Q circuits must be simultaneously adjusted to resonance, but there is interaction between the two, thereby requiring several readjustments. Also, if the trap is not accurately adjusted to the video carrier frequency, enough signal will be passed to provide a watchable, although poor quality picture.

SUMMARY OF THE INVENTION

It is an object of the present invention to provide a jamming circuit having a trap filter which overcomes the problems of temperature stability and critical circuit tuning.

It is another object of the present invention to provide a jamming circuit having a tunable bridged T trap filter which severely modulates the carrier frequency of the preselected channel.

It is still another object of the present invention to provide a jamming circuit which can be selectively bypassed in response to a control system from the customer.

It is still an additional object of the present invention to provide a jamming system in which the trap filters have their filter characteristics substantially reduced in response to a control signal from the operator of the CATV system.

According to the present invention, there is provided a jamming circuit for use in a secure cable television system of the type in which a television signal for a preselected channel is made unusable at a television receiver and a method of jamming the preselected television signal. The jamming circuit includes a tunable trap filter receiving the television signal and being adapted to be tuned to the carrier frequency of the preselected channel and a device for cyclically tuning the trap filter through the carrier frequency so that the television signal is modulated to produce severe amplitude and phase distortion, the modulation being related to the cyclic nature of the tuning. In the preferred embodiment, the tunable trap filter is a bridged T section filter having a pair of tunable high Q circuits. Cyclic tuning occurs by sweeping the first tunable circuit through the tuned condition at a first frequency and sweeping the second tuned circuit through the tuned condition at a second frequency. As a result, the filter modulates the television signal at the first and second frequencies and at the difference frequency.

Preferably, the cyclic sweeping is accomplished by the use of a varactor as part of the tunable capacity of each of the high Q circuits. A sawtooth waveform is applied to the varactor diode to reverse bias the diode which causes the tuning capacity to sweep at the frequency of the sawtooth waveform. The waveform is produced by a free running oscillator producing a square wave which is then integrated with respect to time. Preferably, the first and second frequencies are chosen to be near the horizontal sync pulse rate to increase the jamming effectiveness. Also, if the difference frequency is in the audible frequency range, the jammed signal produces an audible tone at the television receiver. In the preferred embodiment, the frequencies are 14 kHz and 16 kHz, which gives a difference frequency of 2 kHz.

In another aspect of the invention, a control signal from the CATV operator causes the filtering characteristics of the trap filter to be substantially reduced. The control signal inhibits the oscillators and activates a device which forward biases each varactor diode thereby drastically diminishing the Q of each of the tunable circuits. As a result, the trap filter no longer blocks the preselected channel. This signal permits the CATV operator to selectively transmit a channel as either a "pay" or a "free" channel. In addition, a switching device is provided for responding to a control signal from the television receiver for the particular customer to cause the television signal to bypass the jamming circuit.

The method according to the invention includes directing the television signals for all transmitted channels through a trap filter of the type which is adapted to block the video carrier frequency of the preselected channel and cyclically tuning the trap filter to the carrier frequency to severely modulate and phase distort the television signal for the preselected channel. Where the trap filter is a bridged T section, the step of cyclically tuning preferably includes sweeping the first tunable circuit through the tuned condition at a first frequency and sweeping the second tunable circuit through the tuned condition at a second frequency.

DESCRIPTION OF PREFERRED EMBODIMENTS

Figure 1:
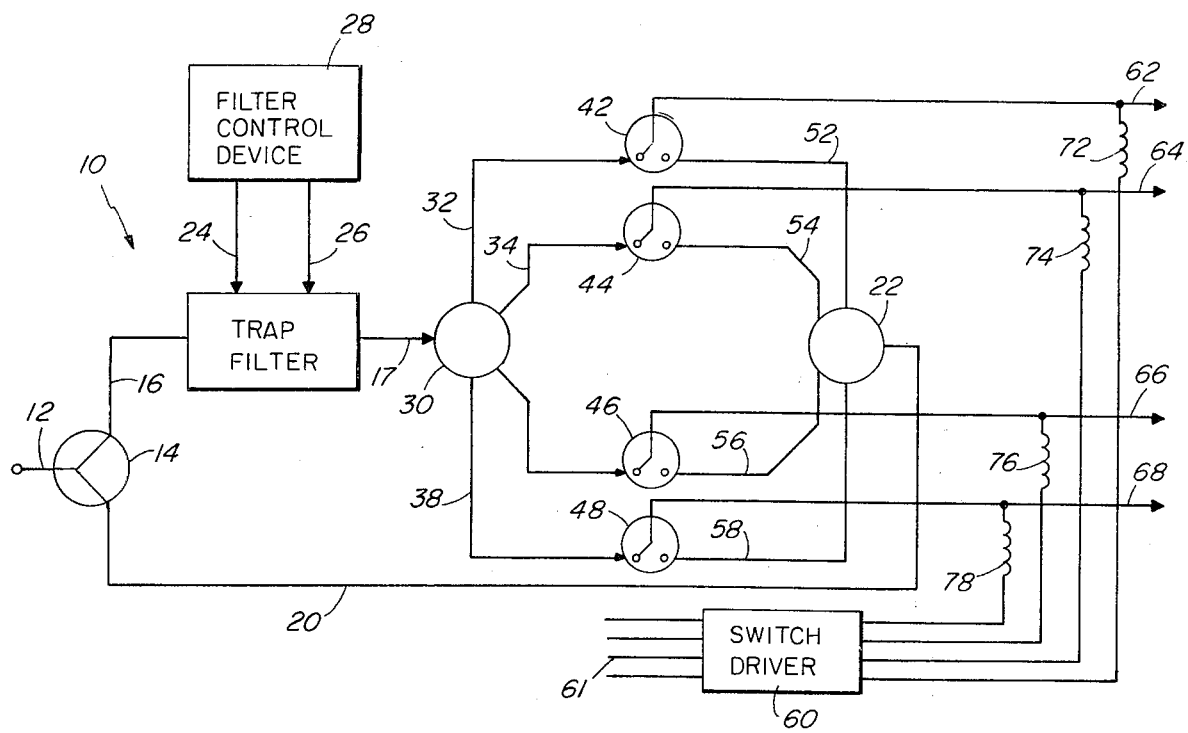
FIG. 1 is a block diagram of a trap jamming system in accordance with the principles of the present invention.

In an exemplary embodiment of the present invention, as illustrated in FIG. 1, there is provided a jamming circuit, represented generally by the reference numeral 10, for use in a secure CATV system. The jamming circuit 10 is adapted to be pole-mounted to serve one or more cable TV customers. In the example shown in FIG. 1, the jamming circuit 10 is for use in servicing four customers. The television signals for all transmitted VHF channels are transmitted along a coaxial cable from a central station (not shown) and received at an input 12 of the jamming circuit 10. This input receives all the transmitted VHF channels 2 through 13 anyone or more of which may be a "pay TV" television channel. All television signals are directed to a two-way splitter 14 which provides an output 16 to trap filter 18 and which provides an output 20 to a four-way splitter 22. The trap filter 18 also receives inputs 24 and 26 from a filter control device 28. An output 17 of the trap filter 18 is directed to a four-way splitter 30 which provides outputs 32, 34, 36 and 38 to a contact of a group of four switches, represented by the reference numerals 42, 44, 46 and 48, respectively. Outputs 52, 54, 56 and 58 of the four-way splitter 22 are directed to the other contact of respective switches 42 through 48. Each of the outputs 62, 64, 66 and 68 from the respective switches 42 through 48 is then directed to the television receiver (not shown) of one of the individual customer.

Each of the switches is controlled by a control signal from the receiver of the individual customer. When a customer selects a "pay" television channel, a control signal, such as a dc or low frequency signal, is transmitted from a pay TV control circuit (not shown) at the receiver and is then directed to a switch driver 60. Inductors 72, 74, 76 and 78 connected between the individual customer line and the switch driver 60 comprise a high impedance for the video signals and a low impedance for the control signal. The switch driver generates output signals, collectively designated 61, which actuate the switches 42 through 48 so that the unjammed signals are directed to the customers. The switching function may be performed mechanically or electronically, such as with PIN diode circuitry.

Figure 2:
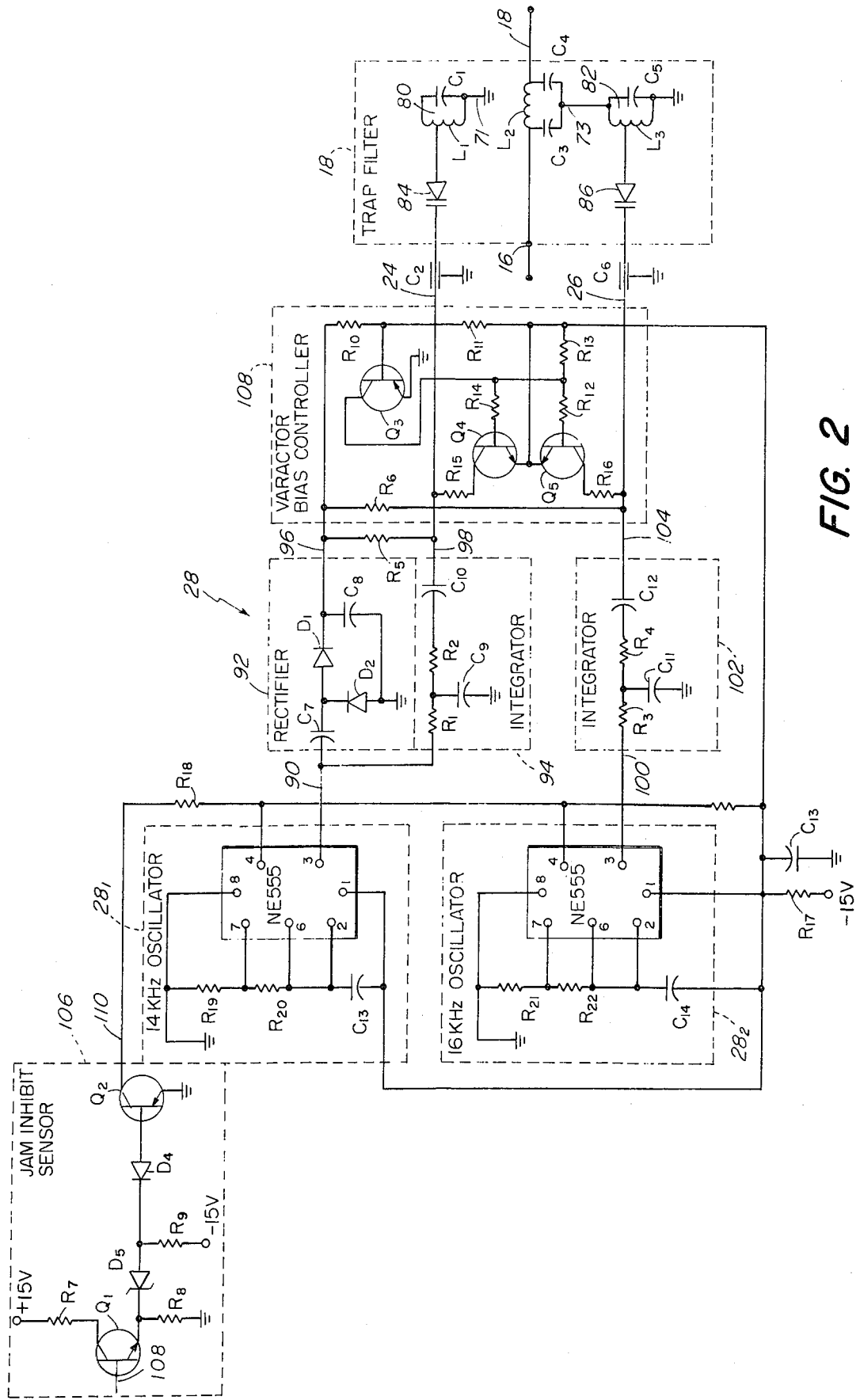
FIG. 2 is a detailed schematic diagram of a jamming control circuit for the filter shown in block diagram in FIG. 1.

Referring now to FIG. 2, there is provided a more detailed diagram of the trap filter 18 and the filter control device 28, shown in FIG. 1. Preferably, the trap filter 18 is a bridged T trap filter, and includes first and second high Q tunable circuits 80 and 82, respectively.

The first high Q circuit comprises an inductor L1 and a capacitor C1 which are connected in parallel, one junction of these elements being grounded at 71. A varactor diode 84 is coupled across a small portion of the circuit 80 by way of a feed-through capacitor C2 which is coupled to ground. The reason for coupling the varactor diode across only a small portion of the tuned circuit is that only a slight frequency deviation, such as ± 500kHz, is required. A DC bias establishes the average value of varactor capacitance. The inductor L1 is magnetically coupled to an inductor L2 which receives the input signal 16 at one terminal and provides the trap filter output signal 18 at the other terminal. A pair of capacitors C3 and C4 are coupled to opposing terminals of the inductor L2 and are coupled together at 73. This junction also is electrically coupled to the second high Q circuit 82. The circuit 82 is formed by the parallel connection of an inductor L3 and a capacitor C5. As in the case of the varactor diode 82, a varactor diode 86 is coupled across a small portion of the circuit 80 by way of a feed-through capacitor C6. Also, a dc bias establishes the average value of varactor capacitance. In FIG. 2, the bridged T section trap filter was designed for channel 5 as the pay TV channel and a commercially available device suitable for this application is that designated BENCO HI-Q75 (channel 5) manufactured by Delta-Benco-Cascade, Ltd. of Rexdale, Ontario, Canada. In operation, the trap filter is an open circuit to the video carrier for channel 5 at the time that the varactor diodes have the proper reverse bias voltage across them. At all times, however, the video carriers for the other channels pass through the filter without attenuation.

According to the invention, there is provided a filter control device for cyclically tuning the trap filter 18 to the carrier frequency of the preselected channel present among the other signals at the input 16. Preferably, the apparatus has the capability of sweeping each Q circuit of the trap filter at different frequencies. It is advantageous to sweep at a frequency that is near the frequency of the horizontal sync pulses (i.e. 15 kHz) since this generates more effective scrambling of the signal. Also, in another feature, the beat frequency is in the audible range so that an audible tone is generated when the scrambled signal is selected at the receiver. The audio tone is caused by the complete loss of picture carrier (and loss of the 4.5 mHz sound beat.) In FIG. 2, frequencies of 14 kHz and 16 kHz (i.e. a 2 kHz difference frequency) were chosen.

Referring now to the left hand portion of the drawing in FIG. 2, there is provided a 14 kHz oscillator $28_1$ and a 16 kHz oscillator $28_2$. An output 90 of the oscillator $28_1$ is directed to a rectifier 92 and an integrater 94. The output of the oscillator is a square wave waveform whose upper level has a positive potential and whose lower level has a negative potential. The purpose of the rectifier is to convert the output waveform from the oscillator $28_1$ into a full wave rectified positive voltage level with respect to ground at an output 96. The rectifier 92 includes a capacitor C7, one of whose plates is coupled to a pair of diodes D1 and D2. The other terminals of these diodes are coupled across a capacitor C8. The purpose of the integrator 94 is to integrate the square wave output with respect to time so as to produce a sawtooth waveform at an output 98. The integrater includes a pair of resistors R1 and R2 and a capacitor C9. The integrator output 98 is directed to the varactor diode 84.

Likewise, an output 100 from the oscillator 28₂ is directed to an integrater 94 which produces a sawtooth waveform from the square wave output of the 16 kHz oscillator. The integrator 102 includes a pair of resistors R3 and R4 and a capacitor C11. A capacitor C12 isolates dc from the integrator output. The output 104 of the integrater 102 is coupled to the varactor diode 86.

The trap filter control device 28 includes means for maintaining the varactor diodes reversed biased, regardless of the status of the sawtooth waveforms during the normal jamming state. This function is accomplished by directing the positive dc voltage level from the rectifier 92 to a resistor R5 which is connected in series with the varactor diode 84 and to a resistor R6 which is connected in series with the varactor diode 86. Thus, in operation, so long as the oscillators are operating, there is a reverse bias voltage applied to the varactors. The magnitude of the reverse bias is swept from one positive level to another, larger positive level at the respective oscillator frequency.

In another feature of the jamming circuit according to the present invention, a device is provided for altering the filtering characteristics of the trap filter 18 so that the jamming capability may selectively be inhibited. For example, it is desirable that the operator of the cable TV system be able to selectively make a given channel either a pay TV channel or a free TV channel. This function is accomplished by the use of a jam-inhibit sensor 106 and a varactor bias controller 108. The inhibit sensor 106 receives an input signal 108 from the cable TV operator. This signal may be a dc voltage level which may be sent down stream from the operator, together with the television signals; a suitable filtering device (not shown), such as an inductor, may be used to separate the video signals from the dc jam-inhibit signal. The jam-inhibit sensor includes a pair of transistors Q1 and Q2, resistors R7, R8, and R9, zener diode D3 and a diode D4. In the absence of a jam-inhibit signal, the transistor Q2 is driven into conduction thereby presenting a voltage on an output line 106 substantially equal to zero volts dc. The zero volt input 110 signal is directed to the oscillators to cause the oscillators to operate. When it is desired to inhibit the jamming circuit, a positive potential with respect to ground is applied to the input 108. This causes the transistor Q1 to conduct, which reverse biases diode D4, thereby causing the transistor Q2 to shut off.

When the oscillators cease to operate, the output 96 of the rectifier 92 is a constant zero volt level. This causes the output of the varactor bias controller 108 to forward bias each of the diodes 84 and 96. The varactor bias controller includes the network comprising transistors Q3, Q4, and Q5 and resistors R10, R11, R12, R13, R14, R15 and R16. During normal jamming operation, the rectifier 92 produces a constant positive voltage at the upper terminal of R10 which forms a part of a voltage divider comprising R10 and R11 which is coupled to a −15 voltage source via a resistor R17 at 119. In this mode, the divider reverse biases the base-emitter junction of Q3. The collector of Q3 is coupled to the base of Q4 and Q5 via resistors R14 and R12. Since Q3 is not conducting, the base-emitter junction of both Q4 and Q5 is reverse biased. With the transistors Q3, Q4, and Q5 in a non-conducting state, the varactor bias controller 108 has no effect on the bias voltage for the varactor diodes 84 and 86. However, when the rectifier has a zero voltage output, the transistor Q3 conducts which causes Q4 and Q5 to conduct. With these transistors conducting, a voltage level of approximately −15 volts dc is presented to one side of the resistors R15 and R16. This causes the varactor diodes to become forward biased which substantially reduces the Q of the tuned circuits 80 and 82.

The following table indicates the identification of and the value of the various components comprising the circuit of FIG. 2.

| trap filter | BENCO HI-Q75 (channel 5) | R5 | 100K ohms |
|---|---|---|---|
| | | R6 | 100K ohms |
| | | R7 | 430 ohms |
| R1 | 10K ohms | R8 | 430 ohms |
| R2 | 10K ohms | R9 | 12K ohms |
| R3 | 12K ohms | R10 | 100K ohms |
| R4 | 12K ohms | R11 | 200K ohms |
| R12 | 20K ohms | Q3 | 2N3906 |
| R13 | 12K ohms | Q4 | 2N3904 |
| R14 | 20K ohms | Q5 | 2N3904 |
| R15 | 1K ohms | D1 | 1N914 |
| R16 | 1K ohms | D2 | 1N914 |
| R17 | 100K ohms | D3 | 1N4733 |
| R18 | 1K ohms | D4 | 1N914 |
| C2 | .001 µf | 14 kHz oscillator NE555 | |
| C6 | .001 µf | R19 | 2K ohms |
| C7 | .1 µf | R20 | 91K ohms |
| C8 | .1 µf | C13 | |
| C9 | .002 µf | 16 kHz oscillator NE555 | |
| C10 | .1 µf | R21 | 2K ohms |
| C12 | .1 µf | R22 | 100K ohms |
| C13 | 10 µf | C14 | 510 pf |
| Q1 | 2N3904 | | |
| Q2 | 2N3906 | | |

The embodiment of the present invention is intended to be merely exemplary and those skilled in the art shall be able to make numerous variations and modifications of it without departing from the spirit and scope of the present invention. All such variations and modifications are intended to be within the scope of the present invention as defined by the appended claims.

I claim:
1. A jamming circuit for use in a secure cable television system of the type in which a television signal for a preselected channel is made unusable at a television receiver, comprising:
   a. a tunable trap filter receiving the television signals and being adapted to be tuned to the carrier frequency of the preselected channel; and
   b. means for cyclically tuning the trap filter to the carrier frequency of the preselected channel so that the television signal of the preselected channel is amplitude modulated and phase distorted in a manner related to the cyclic nature of the tuning, the tunable trap filter being a bridged T section filter having a pair of tunable high Q circuits and the cyclic tuning means having means for sweeping the first tunable circuit through the tuned condition at a first frequency and for sweeping the second tunable circuit through the tuned condition at a second frequency, the filter modulating the television signal at the first and second frequencies and at a frequency equal to the difference between the first and second frequencies.

2. A jamming circuit according to claim 1 wherein the sweeping means includes:
   a. means for generating first and second waveforms at the first and second frequencies, respectively; and
   b. means responsive to the waveforms for altering the tuned condition at the first and second frequencies.

3. The jamming circuit according to claim 2 wherein the waveform generating means includes first and second square wave oscillators and means for integrating the square waves to produce first and second sawtooth wave forms.

4. The jamming circuit according to claim 3 wherein the altering means includes:
   a. a first varactor diode operatively associated with the first tunable circuit, the first sawtooth waveform being impressed across the first diode and having a polarity such as to reverse bias the first diode; and
   b. a second varactor diode operatively associated with the second tunable circuit, the second sawtooth waveform being impressed across the second diode and having a polarity such as to reverse bias the second diode.

5. The jamming circuit according to claim 4 further including means responsive to a control signal from the transmitter for reducing the filtering characteristics of the filter.

6. The jamming circuit according to claim 5 wherein the reducing means includes means for forward biasing the first and second diodes to reduce the Q of the first and second tunable circuits.

7. The jamming circuit according to claim 6 wherein the biasing means includes means responsive to the control signal for inhibiting the oscillators and means for applying a constant level of forward biasing voltage across the diodes.

8. The jamming circuit according to claim 1 further including means responsive to a control signal from the receiver for selectively bypassing the filter so that the preselected channel is not jammed.

9. The jamming circuit according to claim 1 wherein the first and second tunable circuits are varied approximately ±500 KHz from the carrier frequency.

10. The jamming circuit according to claim 1 wherein the magnitude of the first and second frequencies is near the frequency of the horizontal sync pulses of a television signal to enhance the jamming effectiveness.

11. The jamming circuit according to claim 10 wherein the frequency of the difference between the first and second frequencies is within the audio frequency range.

12. The jamming circuit according to claim 11 wherein the first frequency is 14 KHz and the second frequency is 16 KHz.

13. A method of jamming the television signal of a preselected channel in a cable television system having television signals for a number of channels including the steps of:
   a. directing the television signals through a tunable trap filter adapted to be tuned to the carrier frequency of the preselected channel so that the filter blocks the preselected channel when the filter is tuned to the carrier frequency,
   b. cyclically tuning the trap filter to the carrier frequency of the preselected channel without tuning the filter to the carrier frequency of the other channels so that the television signal of the preselected channel is amplitude modulated and phase distorted by the cyclic tuning, the filter being a bridged T section trap filter having first and second interdependent high Q tunable circuits and wherein the step of tuning includes the steps of:
   1. sweeping the first tunable circuit through the tuned condition for the carrier frequency at a first frequency, and
   2. sweeping the second tunable circuit through the tuned condition at a second frequency so that the television signal of the preselected channel contains modulation at the first and second frequencies and at a frequency equal to the difference between the first and second frequencies.

14. The method according to claim 13 further including the step of:
   a. selectively bypassing the trap filter in response to a control signal from a receiver of the television signals to avoid jamming the television signal of the preselected channel.

15. The method according to claim 13 further including the step of:
   a. selectively reducing the filtering quality of the trap filter in response to a control signal so that all television signals pass through the filter without attenuation.

16. The method according to claim 13 wherein the first tunable circuit has a varactor diode for controlling the tunable filter and wherein the step of sweeping the first tunable circuit includes the steps of:
   a. generating a square wave at the first frequency,
   b. integrating the square wave with respect to time to produce a sawtooth waveform having a polarity such as to reverse bias the varactor diode of the first tunable circuit; and
   c. impressing the sawtooth waveform across the varactor diode to create a cyclic sequence of values of capacitance at the first frequency, one of the values causing the first tunable circuit to be tuned to the carrier frequency.

17. The method according to claim 16 wherein the second tunable circuit has a varactor diode for controlling the tunable filter and wherein the step of sweeping the second tunable circuit includes the steps of:
   a. generating a square wave at the second frequency;
   b. integrating the square wave with respect to time to produce a sawtooth waveform having a polarity such as to reverse bias the varactor diode of the second tunable circuit; and
   c. impressing the sawtooth wave form across the varactor diode to create a cyclic sequence of values of capacitance at the second frequency, one of the values causing the second tunable circuit to be tuned to the carrier frequency.

18. The method according to claim 16 further including the step of:
   a. selectively forward biasing the varactor diodes to reduce the Q of both tunable circuits.

19. The method according to claim 17 wherein the first frequency is less than the frequency of the horizontal sync pulses of a television signal and wherein the second frequency is greater than the frequency of the horizontal sync pulses.

20. The method according to claim 19 wherein the frequency of the difference between the first and second frequencies is within the audio band width.

21. The method according to claim 20 wherein the first and second frequencies are 14 KHz and 16 KHz, respectively.

* * * * *